Feb. 15, 1927.
A. M. FLORY
PULLEY
Filed May 7, 1926    2 Sheets-Sheet 1
1,618,074
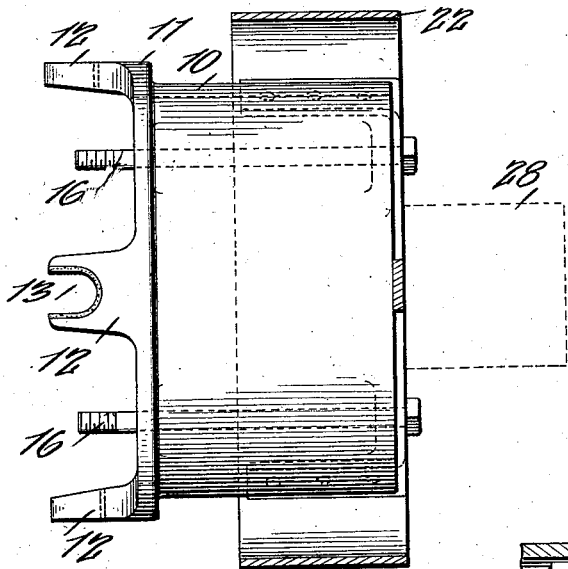
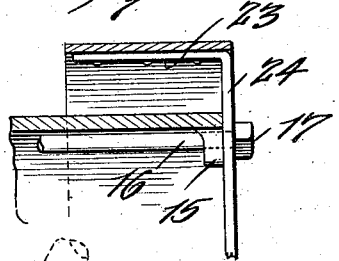
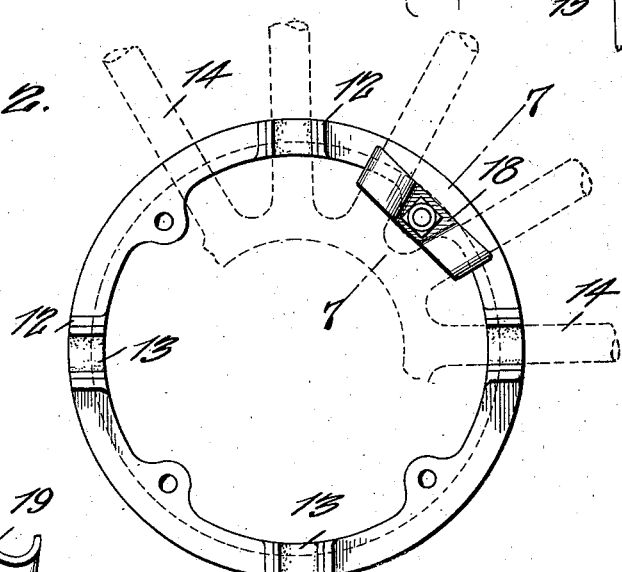
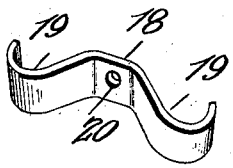
ARTHUR M. FLORY, INVENTOR
BY *Victor J. Evans*
ATTORNEY Feb. 15, 1927.
A. M. FLORY
PULLEY
Filed May 7, 1926  2 Sheets-Sheet 2
1,618,074
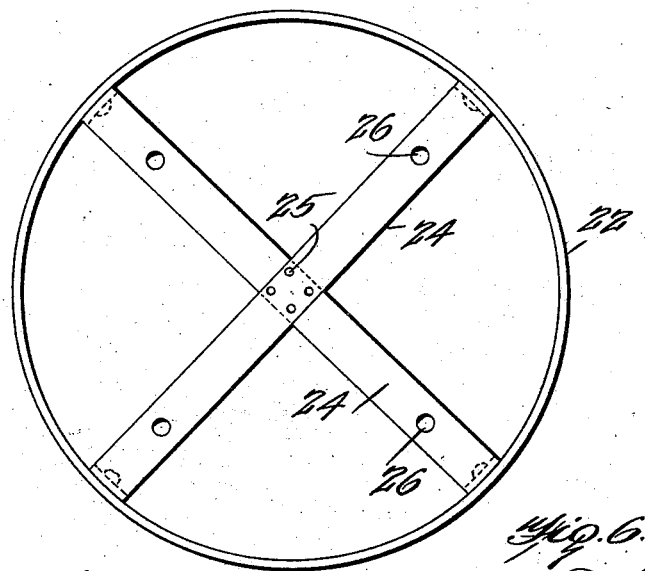
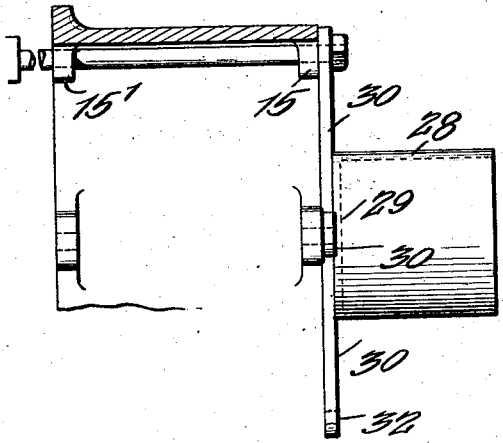
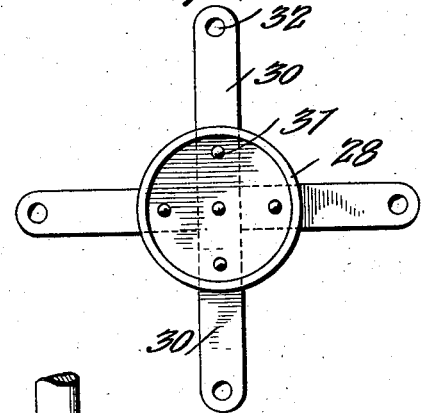
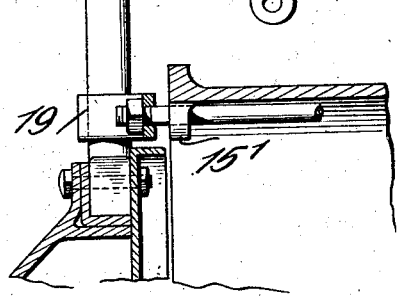
ARTHUR M. FLORY, INVENTOR
BY *Victor J. Evans*
ATTORNEY Patented Feb. 15, 1927.

1,618,074

UNITED STATES PATENT OFFICE.

ARTHUR M. FLORY, OF LONE STAR, KANSAS.

PULLEY.

Application filed May 7, 1926. Serial No. 107,452.

The object of this invention is to provide a pulley of special construction, for attachment to a wheel of a motor vehicle, for power purposes, and especially to provide the pulley with clamping elements for connection with the wheel, and special means for attaching a pulley of different size to the clamping means.

A further object is to provide a pulley with notched lugs for engagement by the spokes of the wheel, clamping members for engaging the spokes from the opposite side thereof, and bolts adapted to pass thru said members and thru ears projecting inwardly from the pulley, these ears serving also to mount a pulley of different size, which shall include apertured radial elements for engagement by the bolts.

With the foregoing and other objects in view, the invention consists in the novel construction and arrangement of elements described, illustrated and claimed, it being understood that modifications may be made within the scope of the claims, without departing from the spirit of the invention.

In the drawings forming part of this application—

Figure 1 is a view showing a pulley in elevation, and showing in vertical section a second pulley applied to the pulley to be connected directly with the wheel, the position which a smaller pulley would assume, being indicated in dotted lines.

Figure 2 is a view looking from the left in Figure 1, the pulley being in elevation, and a clamping plate or the like of the type shown in Figure 8 being applied; the spokes appear in dotted lines.

Figure 3 is a detail in section showing a bolt passing thru one of the radial arms of the larger pulley of Figure 4 and passing thru ears on the pulley to be connected directly with the wheel.

Figure 4 shows the larger pulley in elevation, looking from the left in Figure 1 or Figure 3.

Figure 5 is a detail view showing the pulley of Figure 6, and the radial arms thereof applied to the ears on the pulley to be connected directly with the wheel.

Figure 6 shows the smaller pulley in elevation, and the radial arms connected therewith.

Figure 7 is a detail in section, on the line 7—7 of Figure 2.

Figure 8 is a perspective view of one of the clamping members adapted to engage the spokes on the side thereof opposite to that engaged by the notched lugs of Figure 1.

The pulley 10 includes a flange 11, and lugs 12 extending in the direction shown in Figure 1 and provided with notches 13 for engagement by the spokes 14, shown in dotted lines in Figure 2.

The pulley is further provided with inwardly extending lugs or ears 15, on the side or edge opposite the lugs 12, and bolts 16 pass thru ears 15, the heads 17 of the bolts being adapted to engage the ears 15 or to engage the radial arms of another pulley, when the latter is employed.

Clamping plates or members of the form shown in Figures 2 and 8 are employed and are adapted to engage the spokes on the sides thereof next to the vehicle body, these clamping members including, or each including, a central portion 18, and curved or U portions 19 extending in opposite direction. Apertures 20 permit of the accommodation of bolts 16, and the manner of clamping pulley 10 to the wheel will be readily understood from the description of the elements and their relation to each other. Ears 15' are for obvious reasons employed on the side of the pulley 10 next to the wheel, and the bolts 16 pass thru both sets of ears.

In order to provide a drive at a different speed, a larger pulley 22 may be employed, and this pulley has secured to the inner walls of the circumferential portion, the members 23 of the radial arms 24, which serve a purpose similar to that served by spokes, the elements 24 overlapping or rather extending across one another and being secured by bolts or rivets 25.

Arms 24 are provided with apertures 26, and the bolts 16 are adapted to pass thru these apertures in mounting pulley 22 on pulley 10, when a pulley of a larger diameter is required.

A small pulley 28 includes an end portion 29, and the latter may be secured to arms 30 intersecting or crossing at right angles with reference to each other, connection being effected between the pulley 28 and arms 30 by means of bolts or rivets 31. In applying this pulley 28, the bolts 16 are adapted to pass thru apertures 32 in the ends of elements 30.

Having thus described the invention, what is claimed is:

1. The combination with a pulley including inwardly projecting apertured lugs and longitudinally extending slotted lugs, of clamping plates for engagement with wheel spokes, and securing devices passing thru the apertured lugs and thru the plates, for holding the slotted lugs in engagement with the spokes, on the side opposite the plates, a pulley of greater diameter concentric with reference to the pulley first named, elements extending transversely of the second named pulley and connected therewith, and apertured to permit the securing devices to extend therethru.

2. The combination with a pulley including inwardly projecting apertured lugs and longitudinally extending slotted lugs, of clamping plates for engagement with wheel spokes, and securing devices passing thru the apertured lugs and thru the plates, for holding the slotted lugs in engagement with the spokes, on the side opposite the plates, a pulley of greater diameter concentric with reference to the pulley first named, elements extending transversely of the second named pulley and connected therewith, and apertured to permit the securing devices to extend therethru, a third pulley, devices affixed thereto and extending radially therefrom, and having their outer ends apertured to permit the securing devices to extend therethru.

In testimony whereof I affix my signature.

ARTHUR M. FLORY.